United States Patent [19]
Del Ser Gonzalez

[11] Patent Number: 5,133,250
[45] Date of Patent: Jul. 28, 1992

[54] FRUIT PEELING MACHINE

[76] Inventor: Clemente Del Ser Gonzalez, Paseo de Talleres, No. 36, 28021 Madrid, Spain

[21] Appl. No.: 810,308

[22] Filed: Dec. 19, 1991

Related U.S. Application Data

[63] Continuation of Ser. No. 672,959, Mar. 21, 1991, abandoned.

[30] Foreign Application Priority Data

| Mar. 22, 1990 | [ES] | Spain | 9000835 |
| Nov. 8, 1990 | [ES] | Spain | 9003220 |
| Mar. 15, 1991 | [ES] | Spain | 9100680 |

[51] Int. Cl.$^5$ .......... A23N 7/00; A23N 7/02; A23N 15/00
[52] U.S. Cl. .......... 99/491; 99/546; 99/584; 99/591; 99/593; 99/594
[58] Field of Search .......... 99/539–541, 99/538, 546, 584, 588–591, 593–599, 636; 426/482, 483

[56] References Cited

U.S. PATENT DOCUMENTS

| 1,380,259 | 5/1921 | Sharp | 99/595 |
| 1,579,771 | 4/1926 | Kools | 99/591 |
| 1,872,731 | 8/1932 | Goranson et al. | 99/593 |
| 2,483,930 | 10/1949 | Pauls | 99/596 |
| 3,113,603 | 12/1963 | Gardiner | 99/596 |
| 3,881,406 | 5/1975 | Perez | 99/599 |
| 3,982,482 | 9/1976 | Webb et al. | 99/595 |
| 4,503,761 | 3/1985 | Caiilux | 99/590 |
| 4,541,331 | 9/1985 | Narisawa et al. | 99/537 |
| 4,765,234 | 8/1988 | Cailliot | 99/597 |
| 4,771,682 | 9/1988 | Ishikawa | 99/590 |

FOREIGN PATENT DOCUMENTS

| 0275810 | 7/1988 | European Pat. Off. | 99/588 |
| 2037147 | 7/1980 | United Kingdom | 99/598 |

Primary Examiner—Timothy F. Simone
Attorney, Agent, or Firm—Akoo-Toren

[57] ABSTRACT

The machine possesses a bed (101) on which is provided a central shaft or turret (105), having an intermittent rotary motion, on the periphery of which are provided six operating positions, two feed operating positions A, diametrally opposite, with which are associated respective hoppers (113) equipped with means for individual entrainment for the fruit (107), means being provided at each of these feed operating positions for the translatory movement of the fruit towards a clamp associated with the centra rotary shaft (105), which clamp entrains the fruit to a second operating position B, where the fruit is peeled by means of two sets of knives (156), each set of knives being actuated by an electric motor (164), and the fruit then passing into a third and final operating position C, within each group, at which the operation of cutting the residual polar caps resulting from the prior cutting operation is completed, specifically with the participation of two large horizontal discoidal knives (175) capable of pivoting horizontally under the actuation of corresponding hydraulic cylinders (180), and which, in the course of the planetary movement, rotate on their own axes to facilitate the cutting.

15 Claims, 15 Drawing Sheets

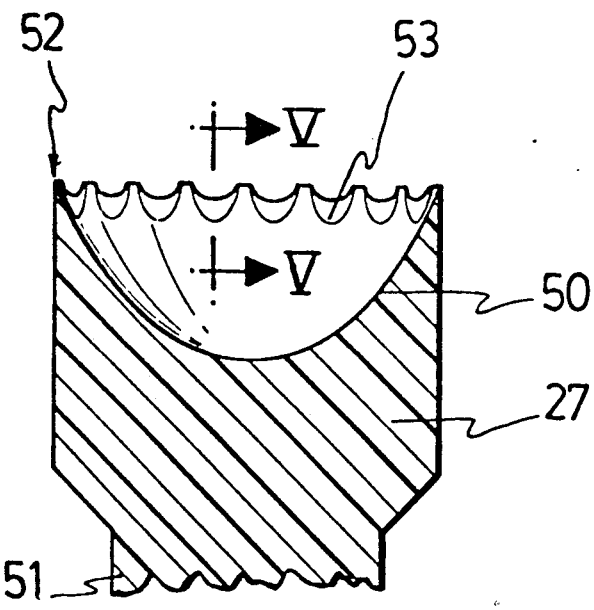
FIG.-3
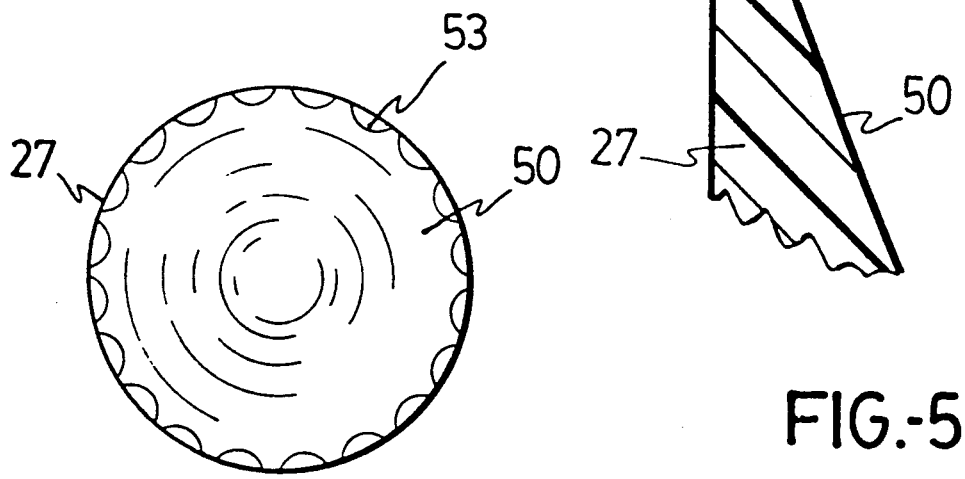
FIG.-4
FIG.-5

FRUIT PEELING MACHINE

This is a continuation application of Ser. No. 07/672,959, filed Mar. 21, 1991 now abandoned.

DESCRIPTION

Subject of the Invention

The present invention relates to a fruit-peeling machine which has been specially designed for the peeling of oranges, but which is equally suitable for the peeling of lemons or of any other type of fruit having a rounded configuration and tending towards a spherical or ovoid configuration.

Prior Art

The present applicant is the proprietor of Spanish Patent 8900316, which discloses a fruit-peeling machine, and in which a description is given of the necessity, in certain industrial processes, such as for example in the production of jams, juices, etc., of accomplishing prior peeling of the fruits, since their peel in many cases comprises components having a strong bitter flavor whose presence in the final product has an adverse effect thereon.

It was also noted that in other cases, such as the cases of the orange and the lemon, peeling is of value simply for the purpose of making use of the rind.

The solution provided in the abovementioned patent consisted in creating a rotary drum having four jaws distributed in an equiangular manner and capable of securing respective fruits, a pair of centring rollers being situated on the upper jaw and receiving the fruits individually from a feed hopper and passing them in synchronised sequence to each of the abovementioned jaws, specifically by allowing them to drop onto a cradle which retains them momentarily until the repeatedly abovementioned jaws act to rotate the drum continuously through an angle of 90°, the jaw which had previously collected the fruit passing to a cutting zone where, by means of a clutch, the jaws and consequently the fruit acquire a rotary motion, provided by a motor, while a pair of knives act on the fruit, passing consecutively over the generating lines of the fruit, owing to the fact that the latter is rotating, causing the complete peeling thereof, and each knife, which has the shape of a cup, furthermore being actuated by a motor, preferably a pneumatic motor, and assisted by a bushing, serving as a sensor, which acts on the outer surface of the fruit, determining the depth of penetration of the knife in any area thereof and independently of the configuration thereof.

Although the machine forming the subject of Patent 8900316 provides a high level of performance, which was considered optimum at that time, the said machine is extremely bulky and complex, and consequently expensive, to which it must further be added that its productivity leaves room for improvement.

DESCRIPTION OF THE INVENTION

The fruit-peeling machine proposed by the invention has been specifically designed and constructed to achieve these objects, achieving on the one hand a substantial structural simplification which enables the machine to be used not only in large-scale industrial processes for the obtaining of peeled fruit in bulk, but also in cases where a much lower level of production is required, such as for example in restaurants and other public establishments where it would be desirable to have a peeling machine available at an associated investment cost which permits an adequate return, while at the same time, in comparison with the first type of application, its rate of production has been substantially enhanced, to the point where it can be quantified as being of the order of ten times greater than that obtained with a machine produced in accordance with Patent 8900316, this being achieved by virtue of a different basic functional design, specifically by virtue of a lower speed of rotation of the fruit and the simultaneous actuation thereon of a large number of knives.

To this end, and more specifically, there is provided on the corresponding bed of the machine, and more specifically on the base platform thereof, a general product intake arm which possesses a forked configuration and between whose lateral branches, and at the free end thereof, are provided the shoes which form the jaw for fixing the product, said arm incorporating means for opening and closing the abovementioned jaws, together with means for the synchronised rotation thereof which will be transmitted to the fruit during the peeling phase, and said arm being pivotably mounted on the base platform for the purpose of moving the jaws from the zone in which the fruit is received to the zone in which it is peeled, which pivoting can be actuated manually or automatically, as can the operation of opening and closing the jaws, as a function of the specific application envisaged for the machine, that is to say automatically in the case of machines intended for high-productivity industrial processes and manually in much simpler applications where the fundamental objective is a reduction in the machine cost level.

In line with the peeling zone, there is provided on the base platform a latch for fixing the general arm in the exact position of the fruit relative to the peeling assembly, and said peeling assembly takes the form of two sets of knives, basically conforming to the knives of Patent 8900316, which knives, within each group, form a circumferential alignment, in that they are very close together, all the knives of each group being mounted on a pivoting support, which is likewise actuatable either manually or automatically in order to move the knives towards or away from the fruit, at the same time as associated springs ultimately tend to press each of said knives against the fruit, with perfect adaptation thereto, each set of knives being associated with a common motor which transmits the motion to all of them via a set of suitably interconnected pinions.

Using the same cutting device of which mention has just been made, but modifying the machine feed mechanisms, specifically automating them, it is possible to increase very substantially the operational output of the machine, specifically in its application to industrial bulk peeling processes, as for example in juice factories, fruit canneries, etc.

In the latter case, the fruit-peeling machine will be formed by a central turret on which are provided means for the simultaneous securing of various fruits, specifically six fruits, and for which an alternating motion is provided which is achieved by means of a geared motor assembly which is kept permanently in motion but which transmits such motion to the abovementioned central turret via a Maltese cross mechanism which produces therein the intermittent motion referred to above, ensuring the necessary stops in order that the appropriate function is performed at each of the six operating positions which surround the turret.

More specifically, two identical operating assemblies are provided around the central turret, each of them having three positions, specifically a feed position, a peeling position and a position for cutting the polar discs which represent the residue from the prior position or peeling phase, the machine naturally being equipped with two product supply hoppers, arranged diametrally opposite relative to the central turret and suitably linked to the respective feed positions.

At each feed position, and at the outlet from the corresponding product supply hopper, is provided a pan which receives the oranges or fruits in question, one by one, there being specifically four pans mounted and distributed in an equiangular manner on the periphery of a rotary plate which, in turn, is associated with a vertical shaft executing intermittent angular movements through 90° in order to move each pan, and consequently each fruit accommodated therein, to the zone of actuation of a product receiving clamp whose jaws are aligned vertically.

This clamp, which is equipped with opening and closing means, is adapted to move a second clamp, the latter being associated with the central turret, with the special feature that the first clamp, which receives the fruit from the pan, simultaneously undergoes during its angular movement a rotary movement, also through 90°, as a result of which, at the moment of releasing the fruit, the said clamp, instead of having its jaws aligned vertically, has them situated in a horizontal alignment which enables the jaw of the central turret, in its turn, to have its jaws vertically aligned in order to receive the fruit, without the first jaws forming an obstacle for this purpose.

The central turret, which possesses as many jaws as there are operating positions provided around it, that is to say having six jaws, after receiving the fruit at one of said jaws moves it to the subsequent operating position, where there is provided a peeling mechanism which is virtually identical to that disclosed in the more simplified solution for the machine, mention of which was made at the beginning of the present section.

This cutting mechanism is capable of incorporating a chromatic sensor which acts as a control means in order to cause the interruption of the cutting operation at the moment that said sensor detects the colour of the pulp of the fruit.

In the subsequent angular motion of the central turret, the fruit passes to the subsequent operating position where these residual polar discs are eliminated, specifically by the interaction of two large, parallel, circular knives which normally occupy, at rest, a lateral position relative to the zone of location of the fruit at this operating position, being actuated by two cylinders which cause the said knives to pivot laterally towards the fruit, and possessing wide toothed sectors which, during this lateral movement, cause the rotation of pinions associated with the shafts of the knives and, consequently, cause the latter to rotate at a sufficiently high speed to ensure optimum cutting conditions. At this time, the same cams which had determined the closure of the jaw in the feed position determine the opening thereof to allow the release and dropping of the peeled fruit, while these residual polar discs are likewise eliminated through suitable ducts, to which they are moved by means of pushers, by blower nozzles or by any other means, leaving the jaw of the central turret able to pass, by a further angular movement of said turret, to the second feed position from which the same operating cycle is repeated.

Furthermore, and as is obvious, the machine will incorporate a camshaft for actuating the non-mechanical devices for synchronising the various operating elements thereof.

DESCRIPTION OF THE DRAWINGS

In order to supplement the description which is being given, and with a view to assisting better comprehension of the features of the invention, the present descriptive specification is accompanied, as an integral part thereof, by a set of drawings wherein the following have been shown, by way of illustration and not limitation:

FIG. 3 shows a view, in lateral elevation and diametral cross-section, of one of the cutting knives which form part of the machine shown in the preceding figures.

FIG. 4 shows an axial or plan view of the same knife.

FIG. 5 shows an enlarged cross-sectional detail of the same knife, along the line of section A—B in FIG. 3.

PREFERRED EMBODIMENT OF THE INVENTION

Figure 1:
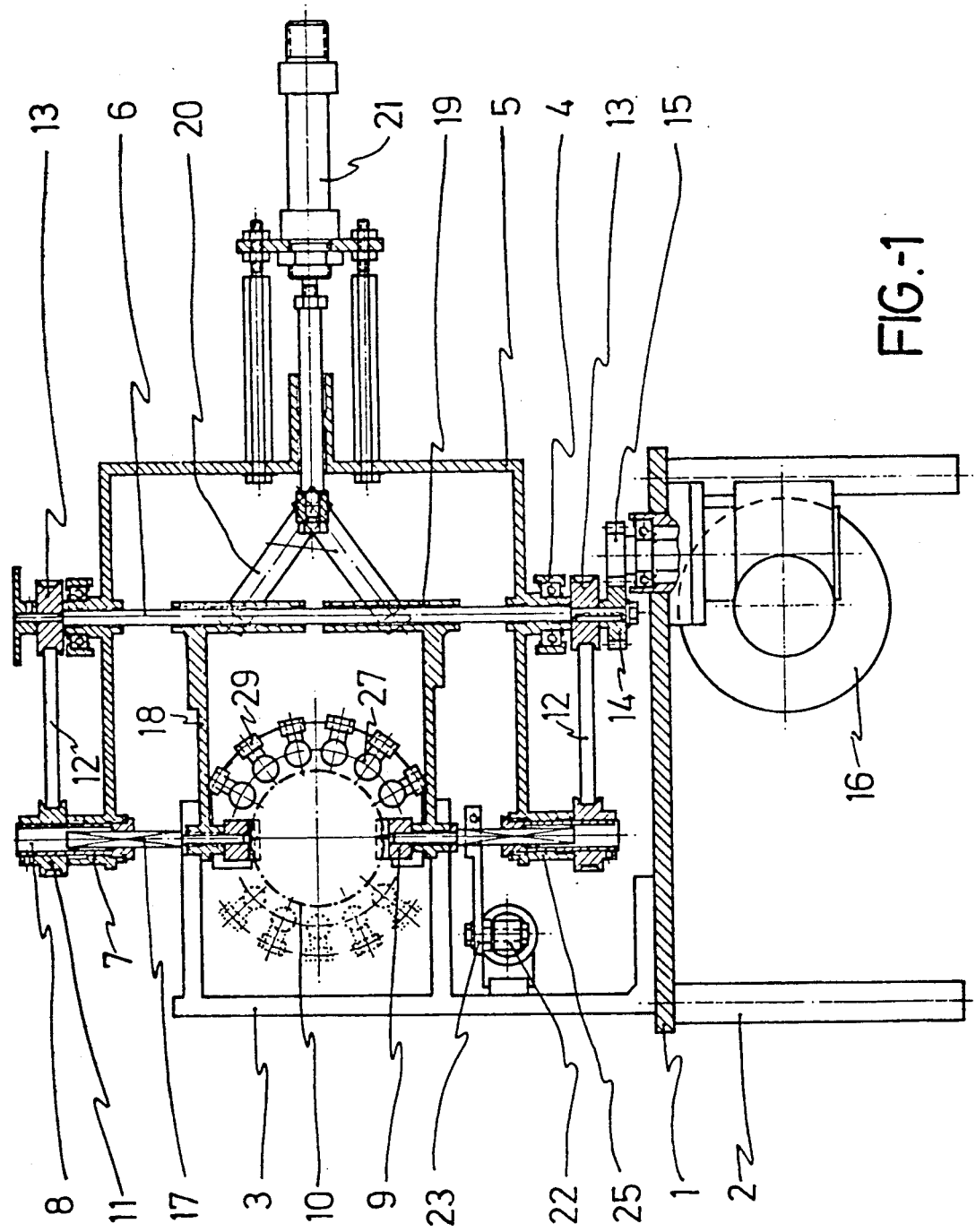
FIG. 1 shows a diagrammatic representation in lateral elevation of a fruit-peeling machine produced in accordance with the subject of the present invention.
Figure 2:
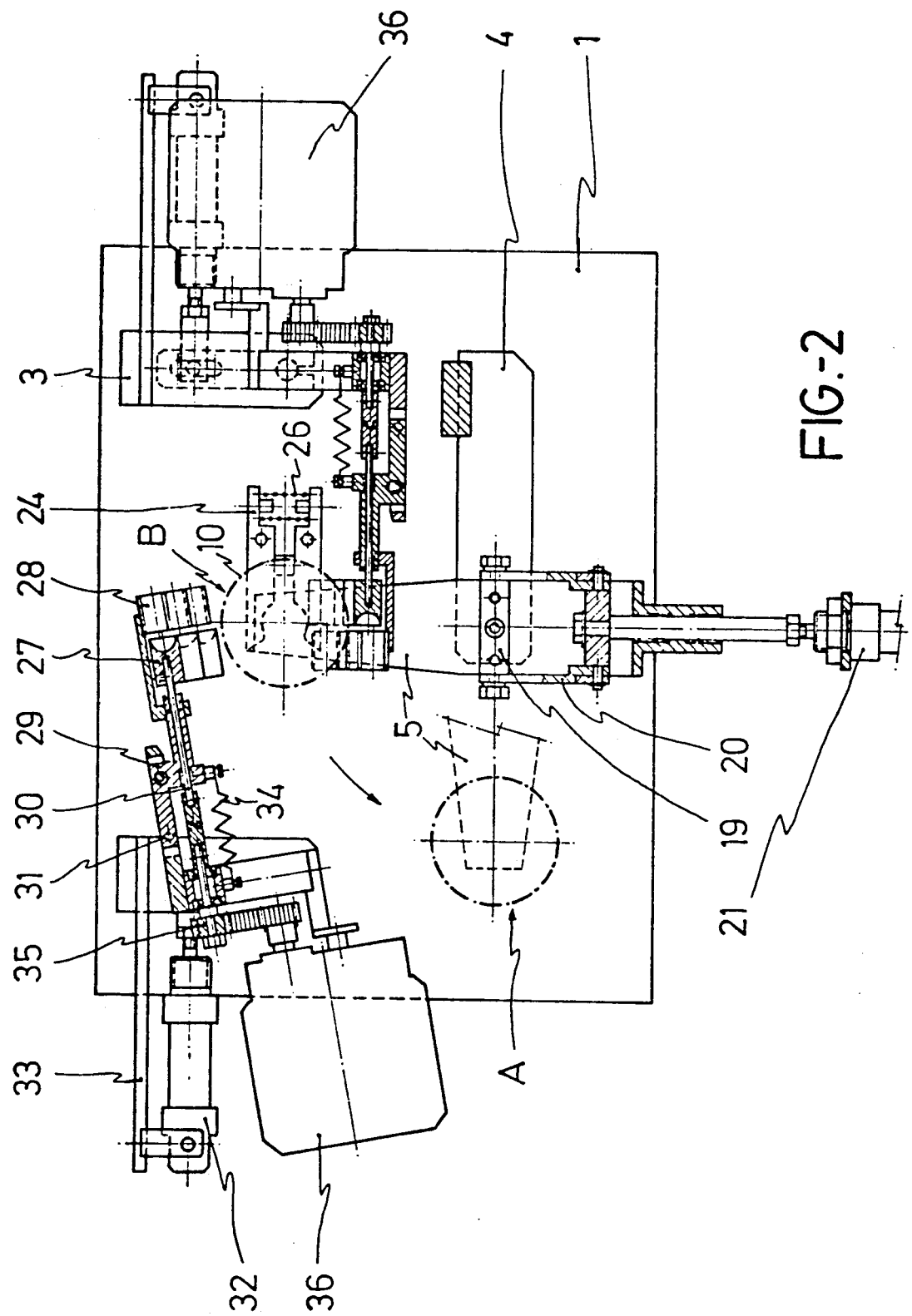
FIG. 2 shows a plan view of the same machine.

On examination of these figures, and more specifically of FIGS. 1 and 2, it may be noted that the fruit-peeling machine which is envisaged incorporates a base platform (1), having its corresponding support feet or legs (2), on which platform are provided, in a non-detachable manner, a pair of fixed supports (3) for the cutting mechanism, and a support (4) for a general product intake arm (5), pivotably mounted on a shaft (6) which passes through said support (4), as may be seen in FIG. 1, the arm (5) possessing a forked configuration, having a lateral aperture, and incorporating at the ends of its free branches two caps (7) in the interior of which engage respective shafts (8) which correspond to the support shoes or jaws (9) for the product, which are coaxially opposed, vertically arranged and capable of rotating and transmitting this motion to the fruit (10) to which end respective pulleys (11) are fixedly attached to their shafts (8) and, by means of toothed belts (12), receive the motion from other pulleys (13) keyed on the actual pivoting shaft (6) of the arm (5), which shaft ends at its lower extremity in a pinion (14) and, by means of the appropriate transmission (15), receives the motion from a motor (16) provided underneath the base platform (1).

In view of the fact that the shoes or jaws (9) must move towards each other to fix the product (10), provision has been made for said jaws to be coupled to their respective shafts (8) with the assistance of square-section rods (17) which permit such movement without loss of the transmission in the angular direction, the jaws as such in turn being associated with a pair of arms (18), ending in bushings (19) which move telescopically on the said arm (6) and to which are connected respective synchronising tension members (20), actuated by a cylinder (21), although the said jaw could equally well be actuated manually, by a mechanical system of the scissor type or the like, in a simpler embodiment of the machine, without this affecting the essence of the invention.

The jaws (9) act on the fruit (10) in a zone A of the machine other than the zone B in which the peeling takes place, in accordance with what is shown in broken and unbroken lines in FIG. 2, in order that the general arm (5) can pivot laterally on its shaft (6), either manually, in the simple embodiment of the machine, or automatically with the interaction of a cylinder (22) and the corresponding connection rod (23).

In any case, there is provided in the cutting zone B a latch (24) in the manner of a clamp which opens under frontal pressure from a collar (25) provided on the lower jaw and against the tension of a spring (26), as may be clearly seen in FIG. 2.

In this peeling zone B, on both sides of the fruit and on the abovementioned supports (3), there are provided two basically identical peeling assemblies, each of which comprises a set of knives (27) to which are assigned corresponding sensors (28) and mounted on pivoting arms (29) through which passes the shaft (30) on which the knives rotate, the arms (29) specifically being pivotably mounted on the supports (3) by means of the shafts (31) and being actuatable either manually, in a simple embodiment of the machine, or by means of respective cylinders (32) mounted on corresponding supports (33), in the automated version, and in either case between two limit positions, the position of inactivity of the knives shown in the upper part of FIG. 2 and the operating position shown in the lower part of the same figure. In either case, a spring (34) interacts with each pivoting arm (29) and, independently of the effect of the cylinder (32), tends to press the knives against the fruit (10) with a view to adapting perfectly to the anatomy of the latter.

In each case, again, the various shafts (30) of the various knives (27) terminate, at their end opposite to said knives, in pinions (35) which simultaneously receive the motion from a motor (36) which is common to all the knives of a single set, there consequently being two motors (36), one for each set of knives, and these motors being mounted on the actual pivoting assembly of the knives, in a manner such that they accompany the latter in their lateral pivotings.

In accordance with this structure, the operation of the machine is as follows:

With the jaws (9) in the open position, which can be achieved either manually or automatically, a fruit (10) reaches the said jaws, again manually or automatically, all this occurring at position A of the base platform (1). Subsequently the jaws, within the context of the general arm (5) pivot into position B while the motor (16) causes the rotation thereof and the consequent rotation of the fruit, this movable assembly remaining rigorously fixed by the latch (24). In this position, and again either manually or automatically, the pivoting arms of the two sets of knives cause the latter to approach the fruit, surrounding it virtually completely, as may be seen in particular in FIG. 1, the sensors (28) resting on the peel of the fruit while the knives (27) perform the cutting or peeling thereof, as a result of their own rotation generated by the motors (36) and affecting the entire surface of the fruit, not only because of the actual profusion of knives but as a result of the rotary movement of said fruit.

The peeling phase having been completed, the sets of knives move away from the fruit (10), and the latter is again moved in translation from zone B to the initial zone A, where the fruit, now peeled, is replaced by a new fruit to be peeled.

Returning again to the knives (27), and as may be seen in FIGS. 3 to 5, each of the knives is formed from a body which has the shape of a type of cup having its curved concave interior (50) in the form of a paraboloid, the base whereof extends on the outside in an axial collar (51) provided with some suitable means of coupling to the corresponding support, and an edge (52) being defined at the aperture of this "cup" or body which forms the cutting edge of the knife, but with the special feature that said edge (52) is equipped with a plurality of internal offsets or facets (53), of half-moon shape, distributed in an equiangular manner along the entire cutting edge, and being mutually adjacent, as may be seen especially in FIG. 3, these offsets or facets being obtained by means of the intersection with the body (1) of a plurality of imaginary cylinders whose equally imaginary axis E, as has been shown diagrammatically in FIG. 5, intersects the imaginary axis E' of the knife, forming therewith an angle alpha of substantial amplitude.

In this manner, a toothed cutting edge is obtained, defined by a broken or toothed rim whose cutting efficiency enables the operating output of the peeling machine to be substantially enhanced.

In accordance with the version of embodiment shown in FIGS. 3 to 14, the fruit-peeling machine is constructed on the basis of a bed (101), terminating at the top in a platform (102) from which there emerges centrally a fixed turret (103) within which is provided a movable turret (104) to which are solidly fixed a pair of plates (105) on which are mounted the clamps or jaws (106) which retain the fruit (107) during the various operating phases that take place at the periphery of this turret where, as has previously been said, there are specifically provided six operating positions divided into two identical groups.

Figure 6:
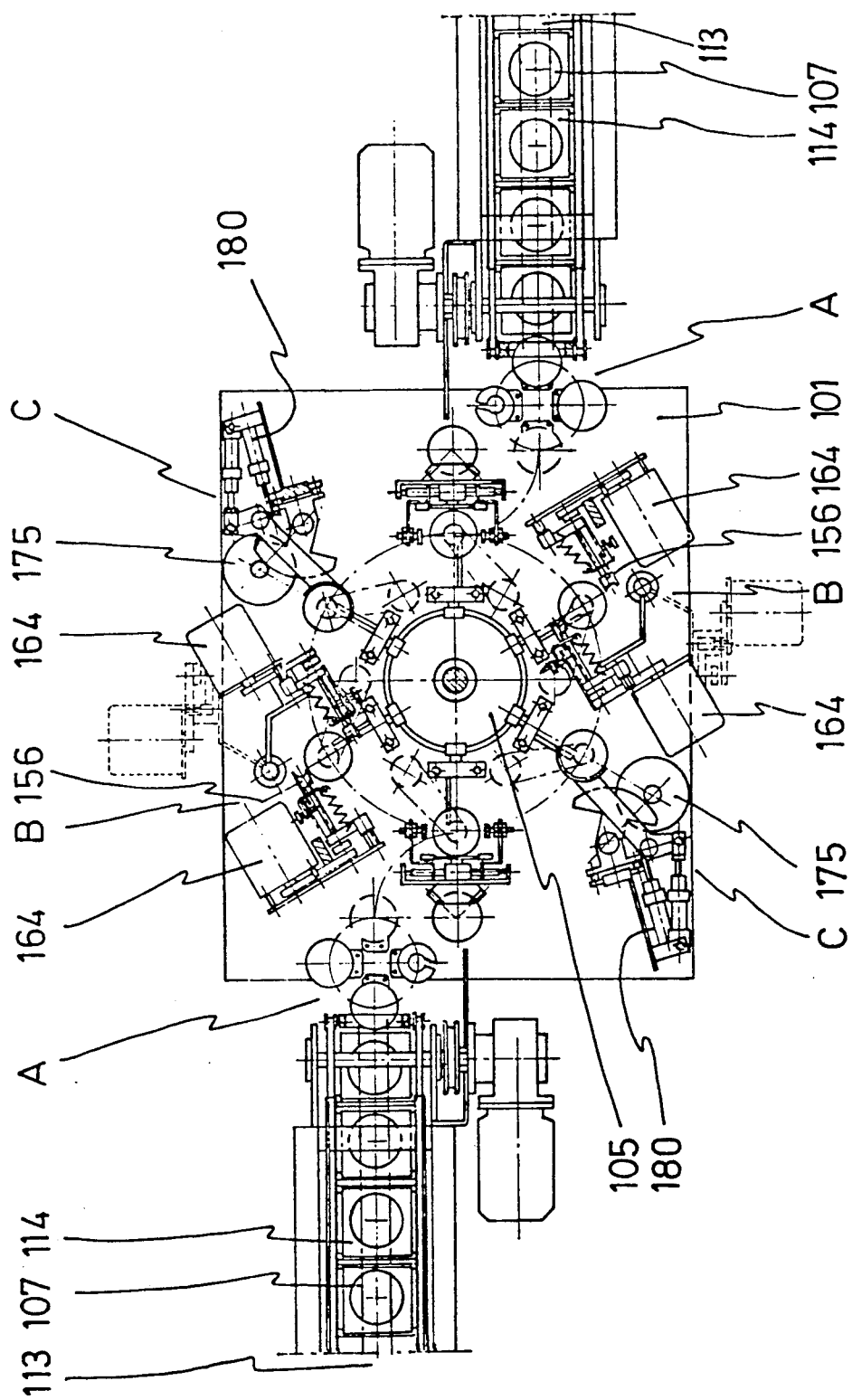
FIG. 6 shows a general plan view of a fruit-peeling machine produced in accordance with an alternative embodiment intended to achieve higher productivity.
Figure 17:
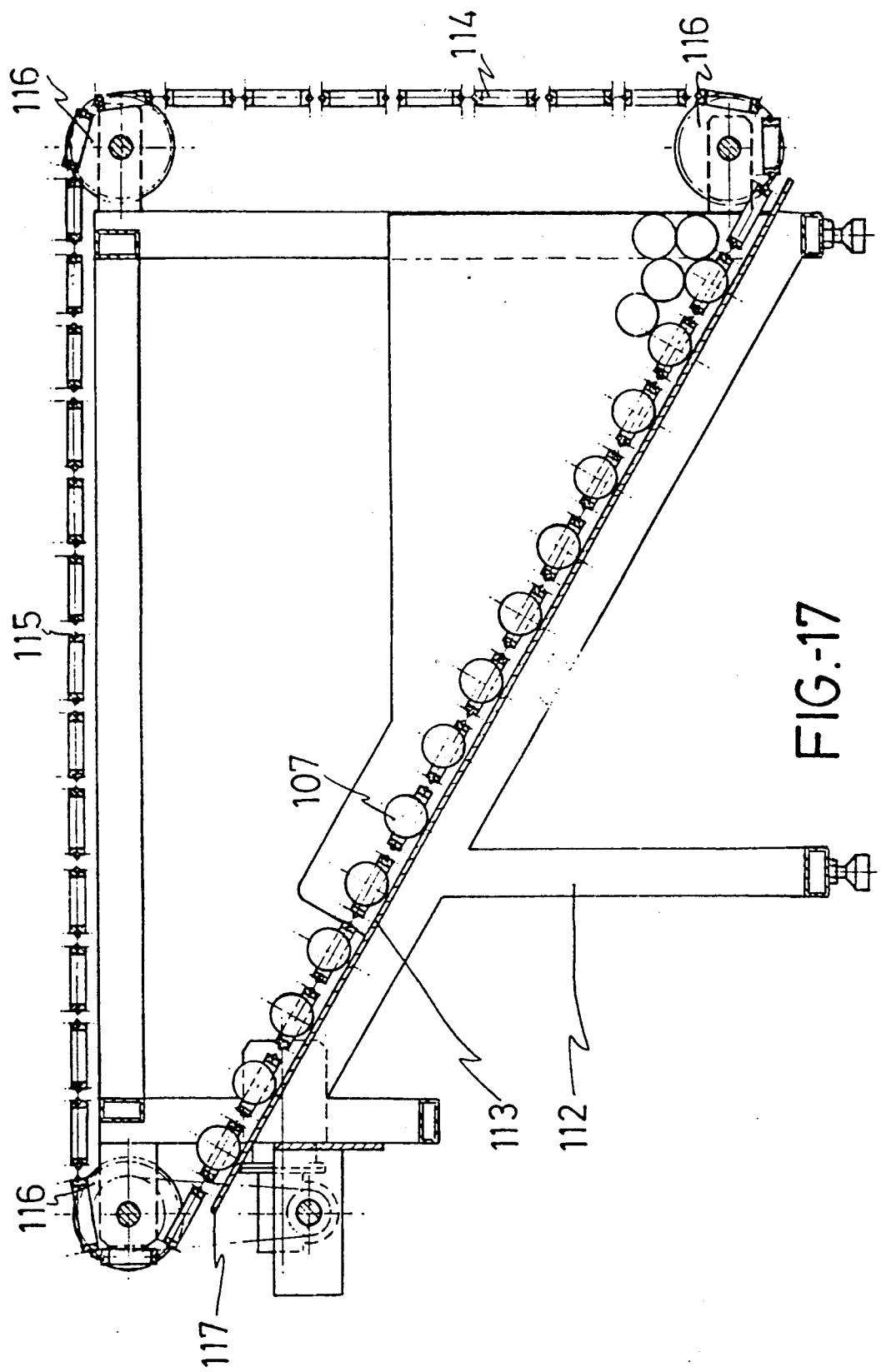
FIG. 17 shows, finally, a view, in lateral elevation and in cross-section, of one of the feeders of the machine.

More specifically, in each of these two operating groups there is a feed position which, in the plan view of FIG. 6, has the reference A and which in turn comprises an auxiliary turret (108) mounted marginally on the platform (102), this turret being hollow and having an internal shaft (109) for the rotation of an upper plate (110) with which are associated, at the periphery thereof, four pans (111) capable of receiving the fruits (107) in sequence from a feed hopper which is shown in detail in FIG. 17 and in which, on a frame (112), an inclined base (113) is provided on which the fruits (107) "roll", entrained by a plurality of cleats (114) mounted on lateral chains (115) which are in turn mounted on sprockets (116) provided in accordance with the vertices of an imaginary right-angled triangle whose hypotenuse is parallel to the ramp (113) by which the product ascends and which is interrupted at its upper end by an edge (117) which is suitably situated relative to the nearest pan (111) in order that the product can fall into the interior of the latter, a lateral stop (118) assigned to each pan (111) helping to retain the fruit as it falls.

Figure 9:
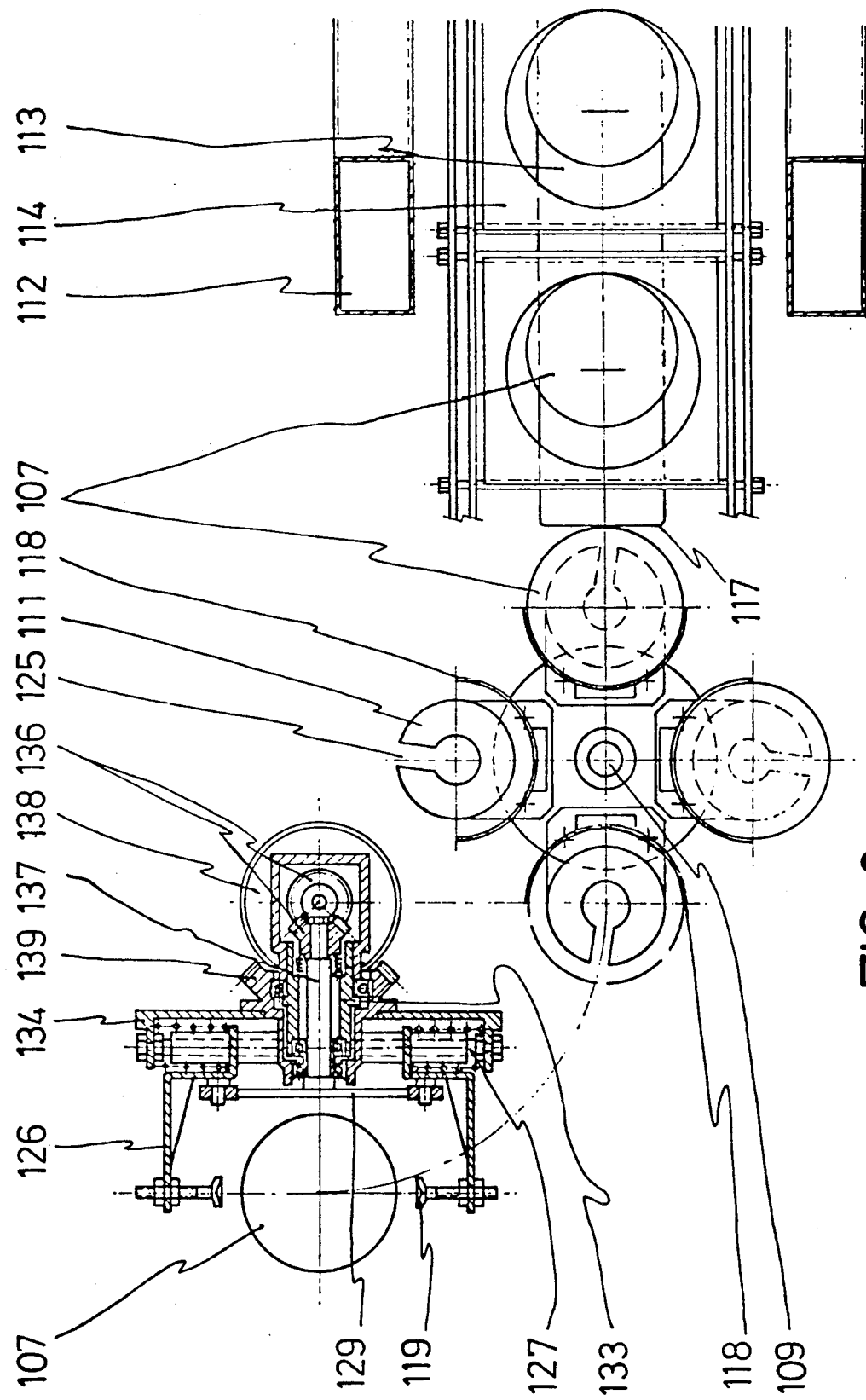
FIG. 9 shows a plan view of the detail of FIG. 5.

The shaft (109) mounted in the turret (108) imparts to the rotary plate (110), and consequently to the pans (111), a rotary and intermittent motion to move them in translation to the zone of actuation of a clamp (119) for collecting the fruit, the turret (108) possessing in this zone a rocker arm (120) and a knuckle (121) which acts on the stop (122) of the shaft (123) by means of which each pan (111) is mounted on the rotary plate (110), which shaft tends to be thrust downwards by a corresponding spring (124), against which the knuckle (121) forces the lifting of the pan (111), always taking place in order that said pan is automatically moved in the vertical direction in order to facilitate the lateral pivoting of the clamp (119), specifically its outward movement via the recess (125) which is possessed by each pan (111) and which is clearly visible in FIG. 9.

The jaws of the clamp (119) are mounted on corresponding supports (126) which are movable on respective coaxially mounted stems (127) against respective springs (128) specifically with the assistance of a cam (129) which acts on knuckles (130) fixed to said supports (126), that is to say that while the springs (128) tend to close the clamp (119), the cam (129) permits the opening of said clamp.

More specifically, each clamp (119) is in turn mounted on a fixed turret (131) within which is provided a movable turret (132) having a radial top projection (133) on which is mounted a support disc (134) for the clamp structure (119), and by means of which said movable turret imparts to the clamp the lateral pivoting motion necessary for the latter to move the product (107) to the clamp or jaw (106) of the central turret of the machine, a shaft (135) also being provided within the movable turret (132) and, by means of conical pinions (136) transmitting the motion to the shaft (137) for actuating the cam (129), in order to open and close the clamp (119).

Moreover, solidly fixed to the upper end of the fixed turret (131) is a fixed ring gear (138) with which engages a movable ring gear (139) associated with the shank (133) in which the shaft (137) of the cam (129) moves, in a manner such that when said shank pivots laterally under the action of the rotation of the movable turret (132), said shank is forced to perform a rotary movement about its own axis, in a manner such that the clamp (119) which receives the fruit (107) from the pan (111) with its jaws vertically aligned, reaches the zone in which the fruit is deposited on the clamp (106) belonging to the central turret with said jaws in horizontal alignment.

Figure 8:
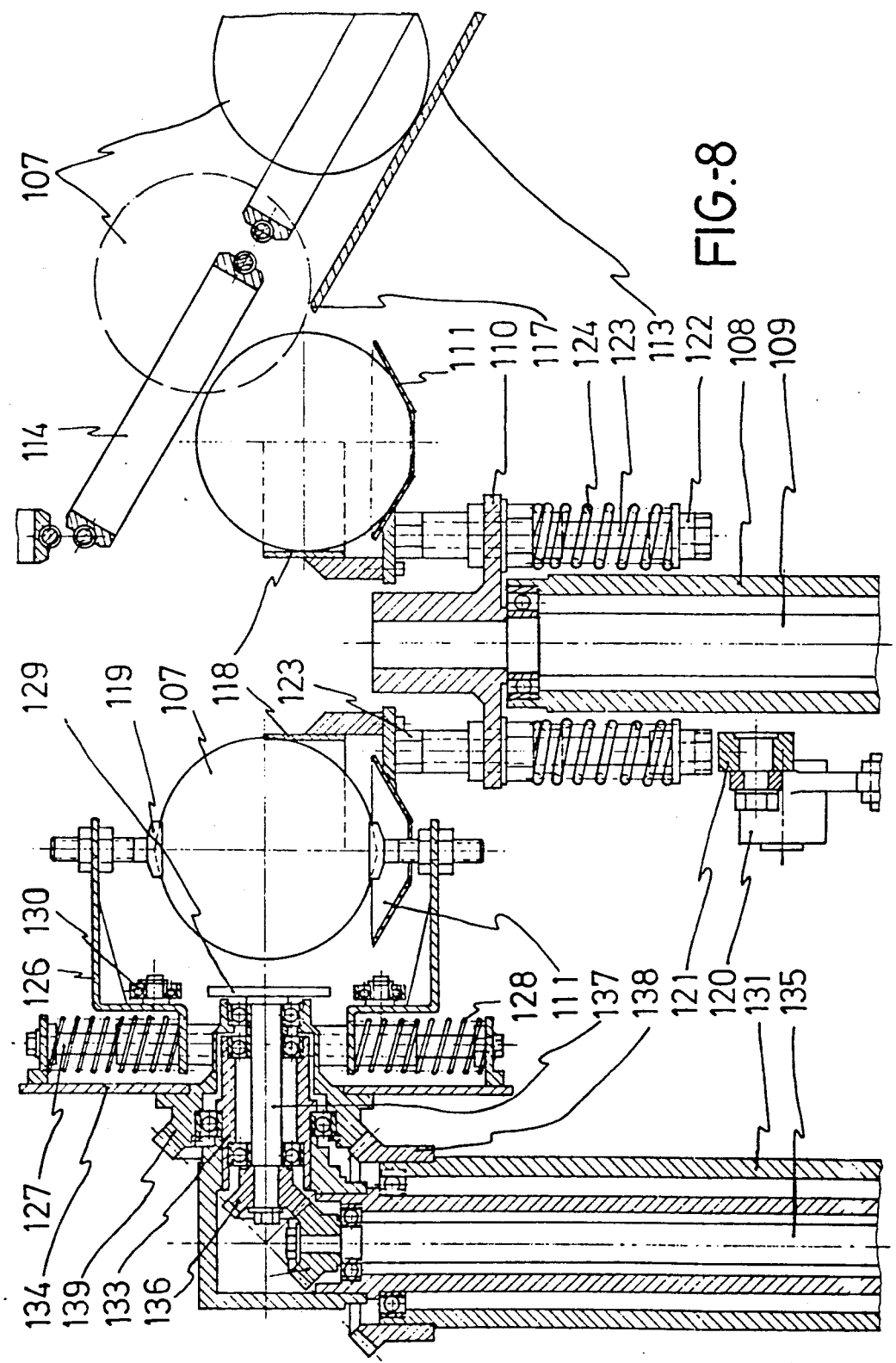
FIG. 8 shows an enlarged detail, in lateral elevation, of one of the feed positions.

Returning once again to the jaws (106) of each operating position of the central turret (103), and more specifically of the plates (105) associated therewith, these clamps, provided with stellate leading edges (140) to enhance their gripping effect on the fruit (107), which on the other hand receive the motion, as will be seen below, via shafts (141), are mounted on support arms (142) which are vertically movable on a pair of shafts (143), specifically with the assistance of blocks (144) which, with an approximately Z-shaped configuration and with forked sectors at their ends, slide on the two shafts (143) as can be seen especially in FIG. 10, and which furthermore possess knuckles (145) on which act respective cams (146), actuated by a shaft (147) which passes through the central support turret (103), which cams obviously tend to open the clamp (106), while a pair of springs (147) tend to close the said clamp, these springs being mounted on said sliding shafts (143) and acting on the blocks (144), as may also be seen in the abovementioned FIG. 8, with the further feature that parallel and opposite racks (148) are defined in these blocks (144) and are associated by means of a synchronising pinion (149) mounted to be free to rotate on a support (150) provided at the periphery of a disc (151) provided between the two cams (146), on which there is naturally mounted one synchronising pinion (149) for each of the six operating positions provided in the machine.

During the peeling process, as is obvious, the fruit (107) is to be subjected to a rotary movement, to which end the abovementioned shafts (141) terminate, at their ends opposite the clamp (106), in pulleys (152) which, by means of belts (153), receive the motion in a synchronised manner from other pulleys (154), one of these being provided with a clutch ring (155) in order to interrupt the rotary movement of the fruit when it is unnecessary, as will be seen below.

Figure 11:
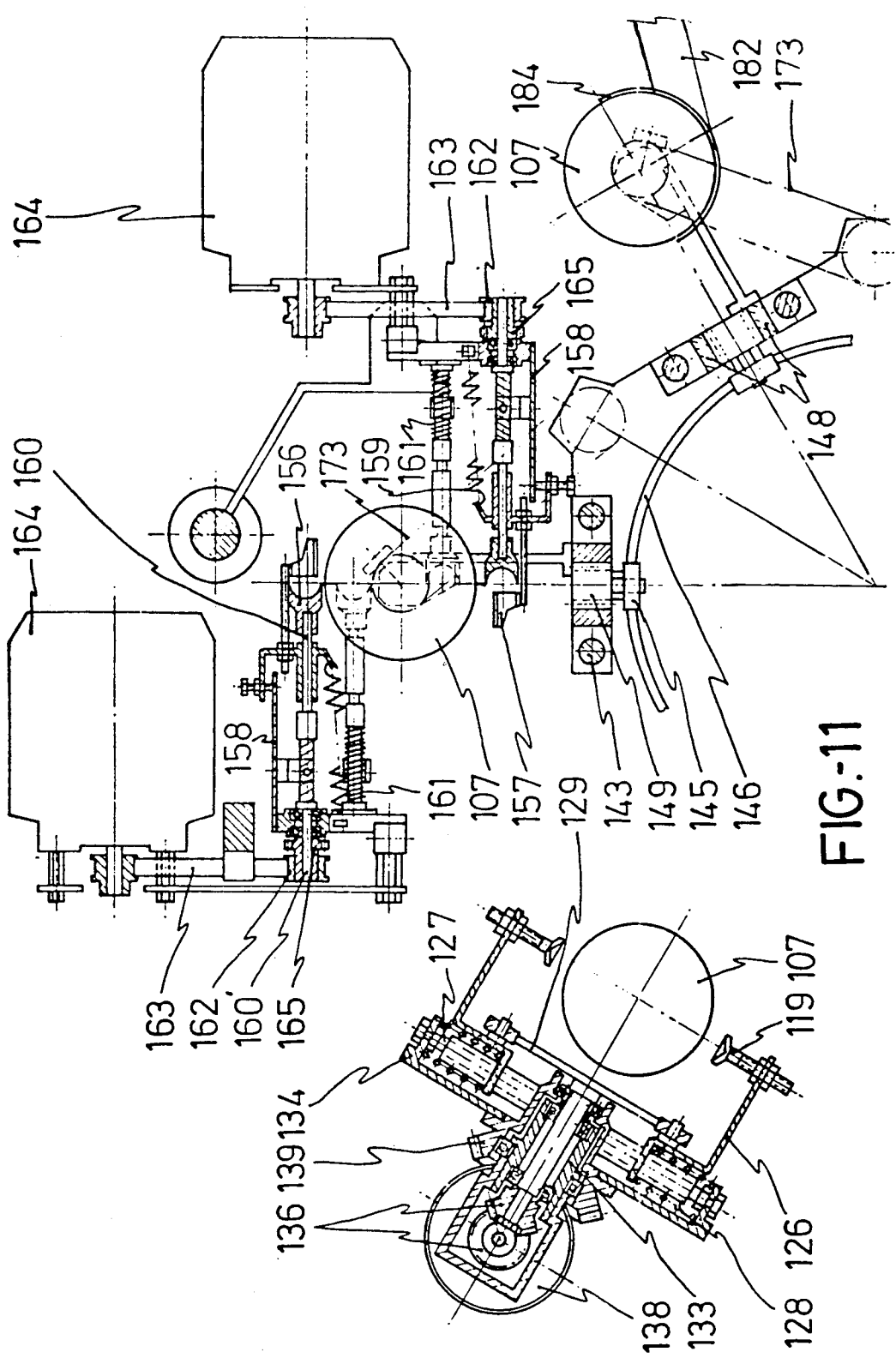
FIG. 11 shows an enlarged detail, in plan view, of the cutting mechanism for the basic peeling of the fruit.
Figure 12:
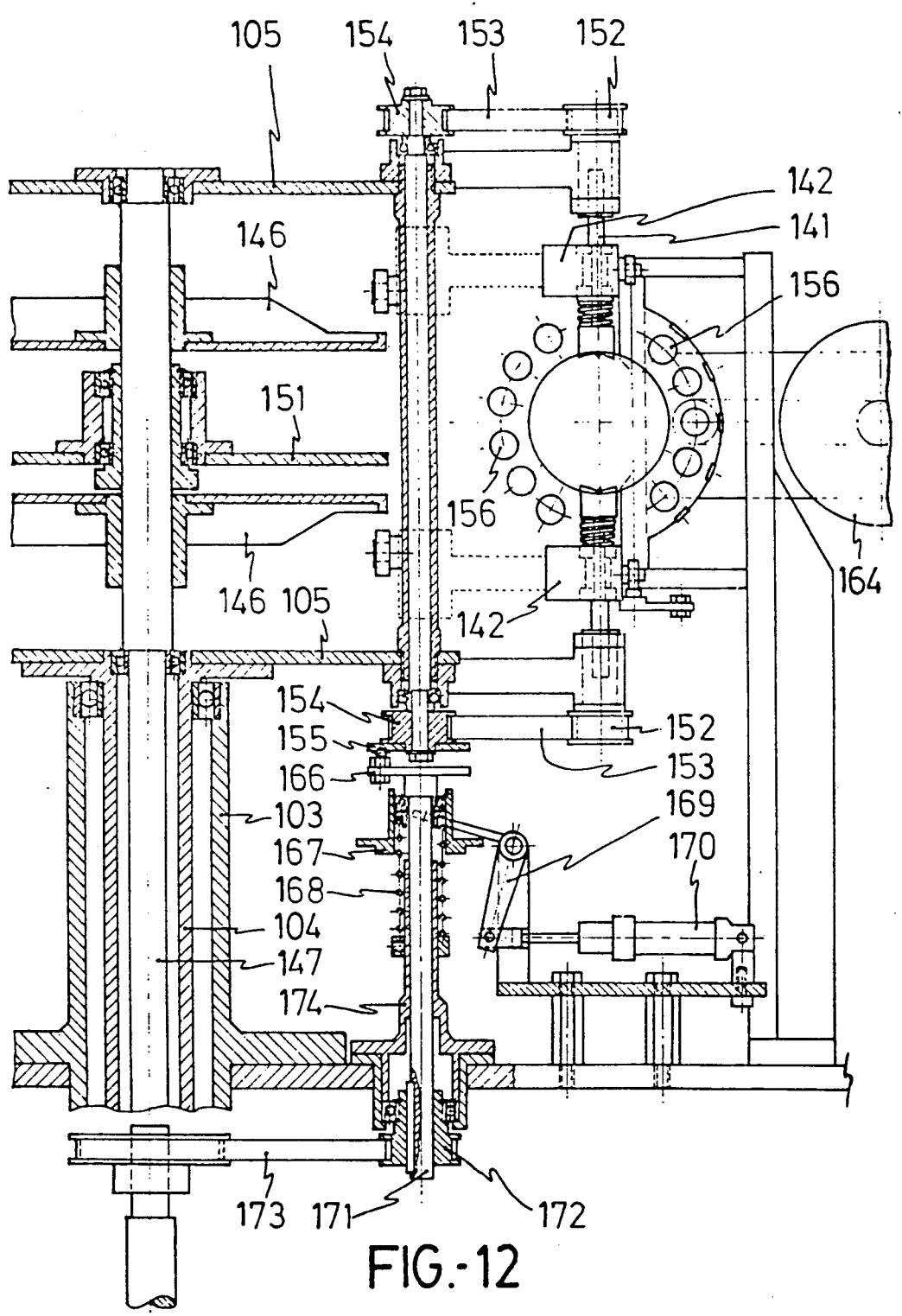
FIG. 12 shows a view, in lateral elevation, of the unit shown in the preceding figure.
Figure 13:
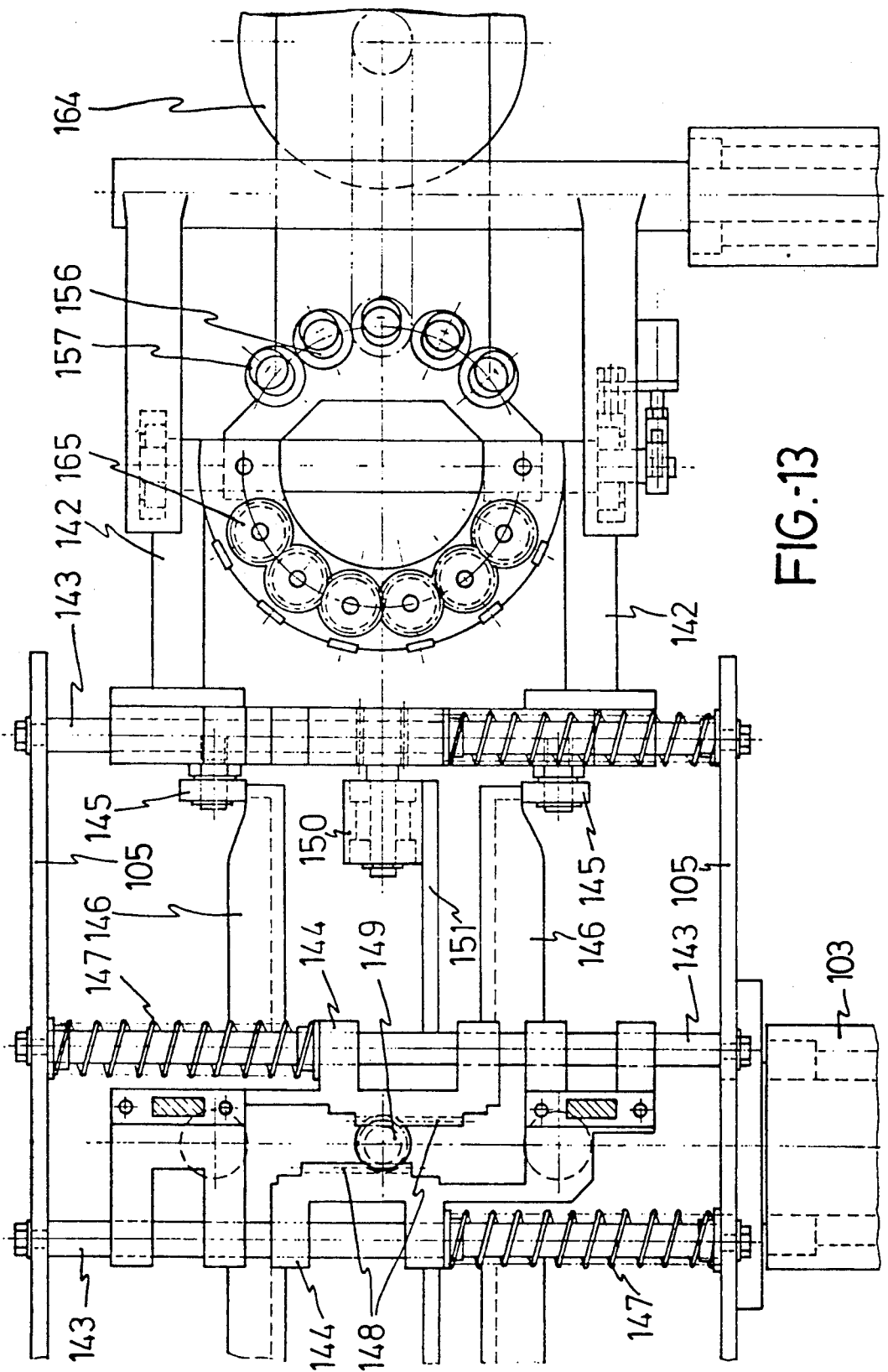
FIG. 13 shows a detail, again in elevation, corresponding to the mechanisms for synchronising the central clamps.

Immediately downstream of each feed position A is provided an operating peeling position B, which is shown in detail in FIGS. 11 and 12, and which takes the form of two sets of knives (156) to which are assigned corresponding sensors (157), preferably one set of six knives and another having five, as may be seen in FIG. 12, the knives of one set expediently being out of phase with those of the other in order that the knives of the first set operate in the interstices defined by the knives of the second. Each knife (156), with its corresponding sensor (157), is mounted on a pivoting arm (158) and tends to approach the fruit under the action of a spring (159) which determines the peeling pressure, said knives (156) having the form of a cylindrical cup whose cutting edge is provided in alignment with the mouth thereof, and said knives being subjected to a rotary movement by means of the shaft (160) which passes through the support (158) and which, by means of a cardan-type joint (161), which may take the form of a spring or another similar element, permits the pivoting movements of the shaft (160) from its distal end (160') opposite the knife (156), where a pulley (162) receives the motion, by means of the transmission belt (163), from a motor (164) which transmits the motion to all the knives of the corresponding set with the assistance of pinions (165) which associate the shafts of said knives.

In these FIGS. 11 and 12 may also be seen the means which impart the rotary movement of the fruit (107), consisting of a clutch disc (166) which acts on the clutch ring (155) actuated by a clutch plate (167) with which is associated a spring (168), the engagement of which is produced by means of a rocker arm (169) actuated by a clutch cylinder (170), the disc (166) being associated with a shaft (171) which, by means of the pulley (172) and the belt (173) receives the motion from another transmission pulley (174), as will be seen below in the discussion of the motive transmission mechanisms of the various operating elements of the machine.

Figure 14:
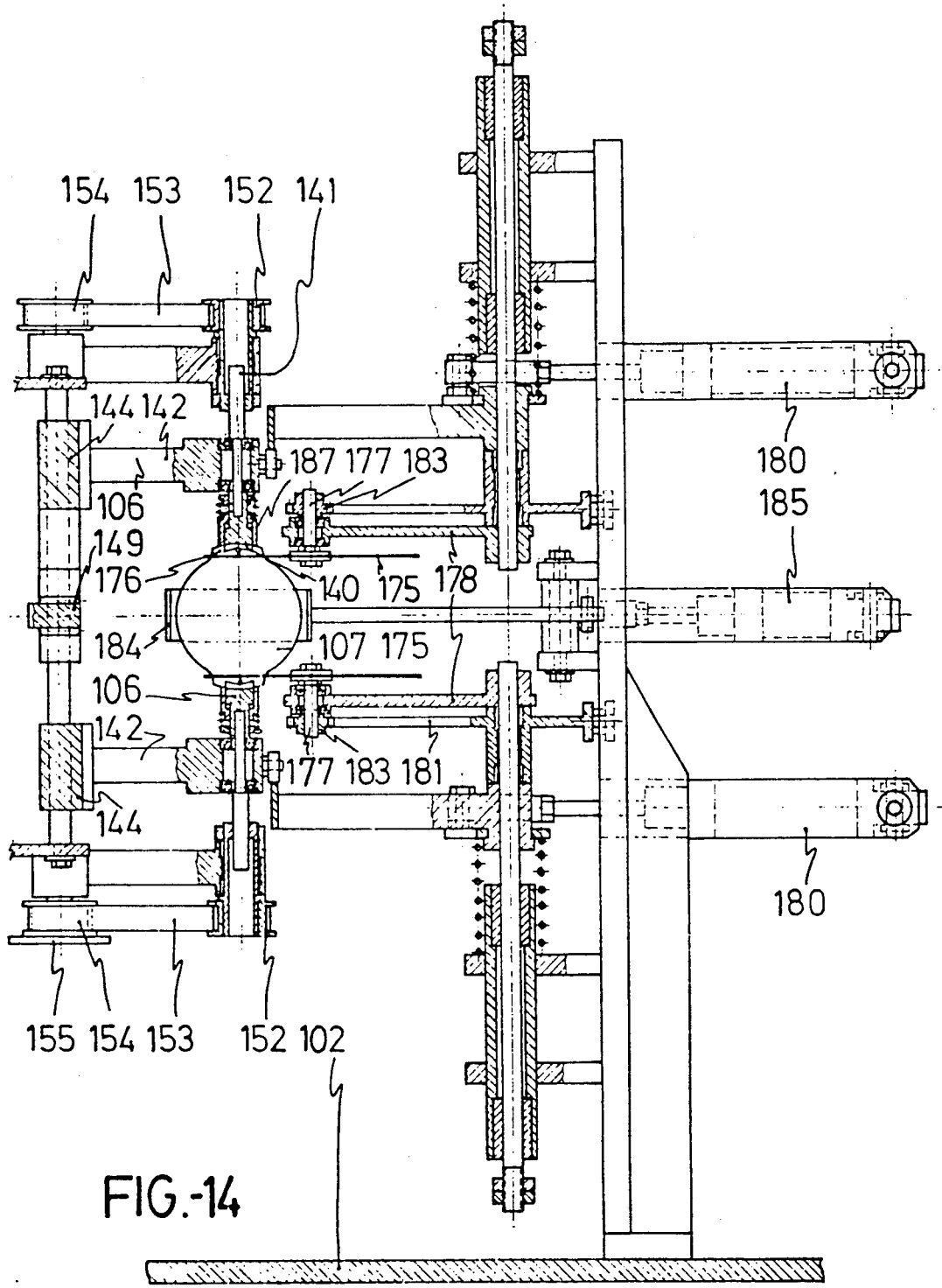
FIG. 14 shows an enlarged detail, in lateral elevation, of the mechanism for cutting the residual polar discs of the fruit after the actuation of the cutting mechanism of FIG. 8.
Figure 15:
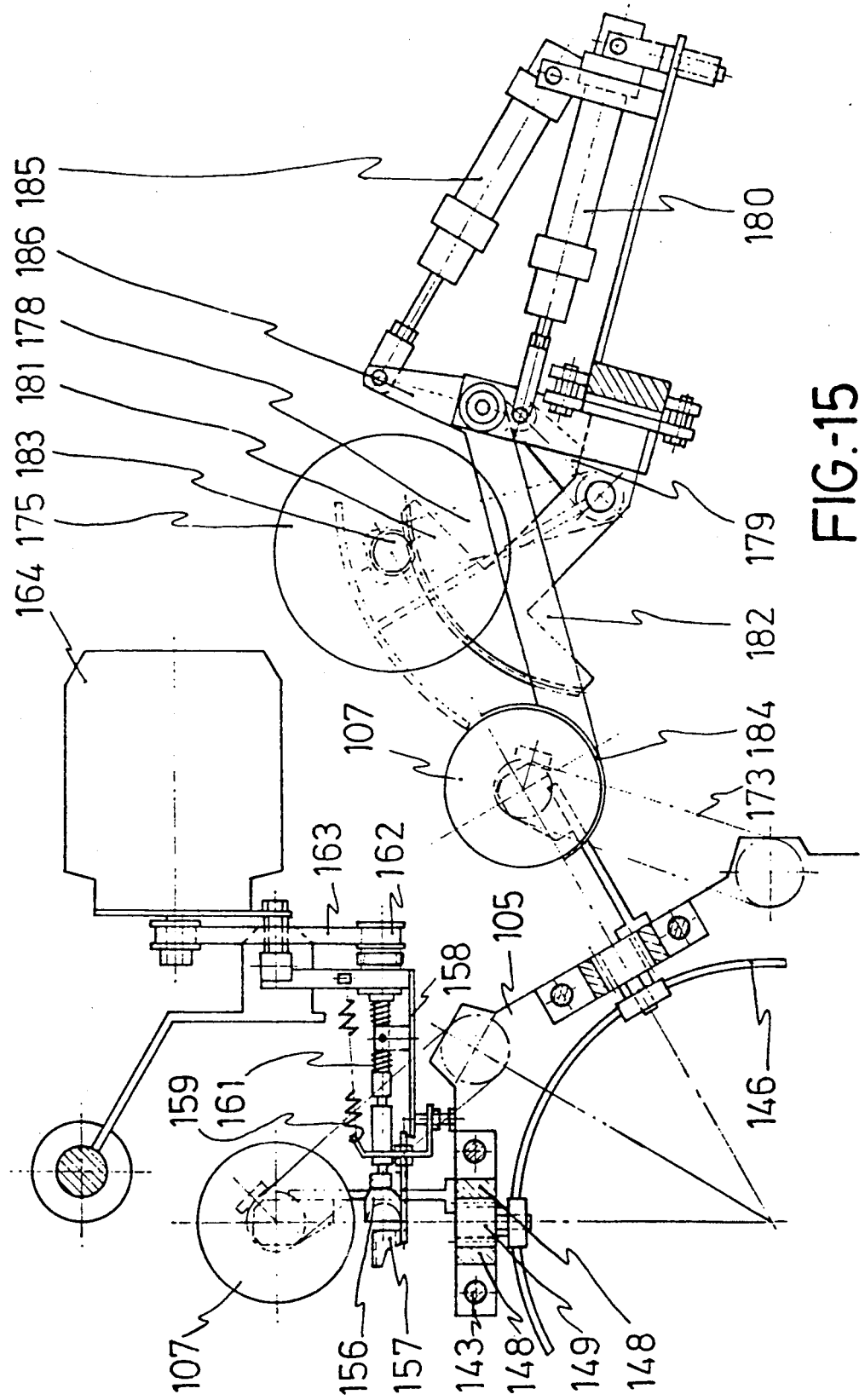
FIG. 15 shows a plan view of the mechanism of the preceding figure.

Downstream of each operating peeling position B is provided an operating position C for cutting the residual polar discs of the fruit, this cutting position being shown in FIGS. 14 and 15. The mechanism corresponding to this operating position C comprises a pair of discoidal knives (175) intended to eliminate these polar caps or discs, which are referenced (176) in FIG. 14, which knives (175) are solidly fixed to shafts (177) mounted to be free to rotate on the end of arms (178) actuated by means of connecting rods (179) by respective cutting cylinders (180), in a manner such that these connecting rods cause the arms (178) to pivot laterally in order that the knives (175) can approach the zone of location of the fruit (107) and cause the cutting of the caps (176). Moreover, adjacent to each arm (178), the mechanism incorporates a fixed sector (181) having a toothed curved edge (182), whose radius of curvature coincides with that corresponding to the trajectory of the shaft (177) and which engages with a pinion (183) associated with said shaft, in a manner such that the pivoting motion of each arm (178) causes a planetary movement of each pinion (183) on the sector (181), with the consequent rotation of said pinion (183) which is transmitted to the corresponding knife (175), which rotates at high speed while it approaches the working zone.

Figure 10:
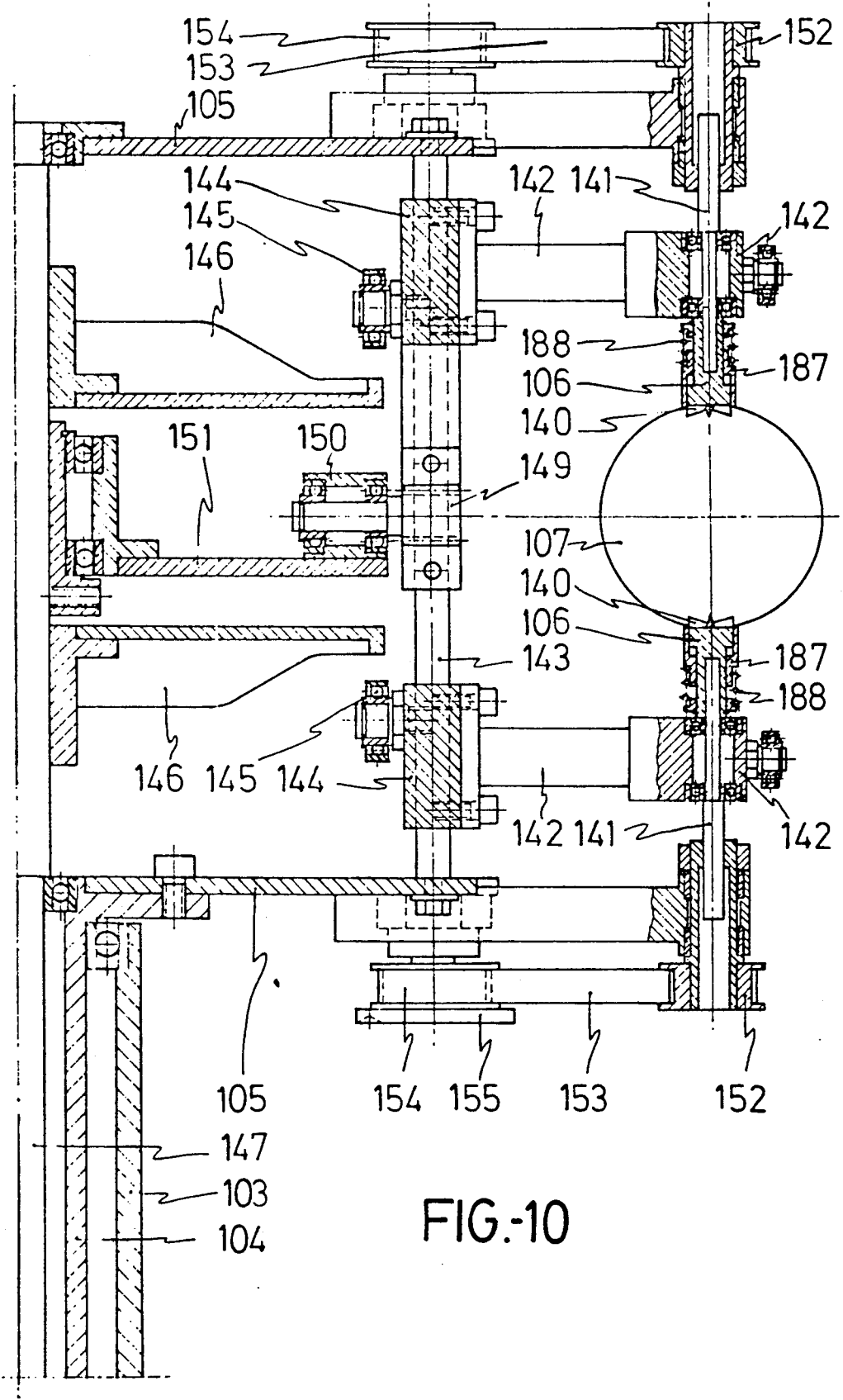
FIG. 10 shows an enlarged detail, in lateral elevation, of one of the various clamps provided on the central turret and corresponding to one of the six operating positions thereof.

This mechanism also comprises an expulsion pan (184) which, once the cutting of the radial caps (176) has been completed, is actuated by an expelling cylinder (185) via another connecting rod (186), causing the elimination of the totally peeled fruit, while the above-mentioned residual caps are released by the cutting stars (140) which hold them fixed by virtue of the fact that two cups (187) are assigned to the jaw (106) in each part thereof, acting as expellers and assisted by respective springs (188), which are specifically visible in FIG. 10.

Figure 7:
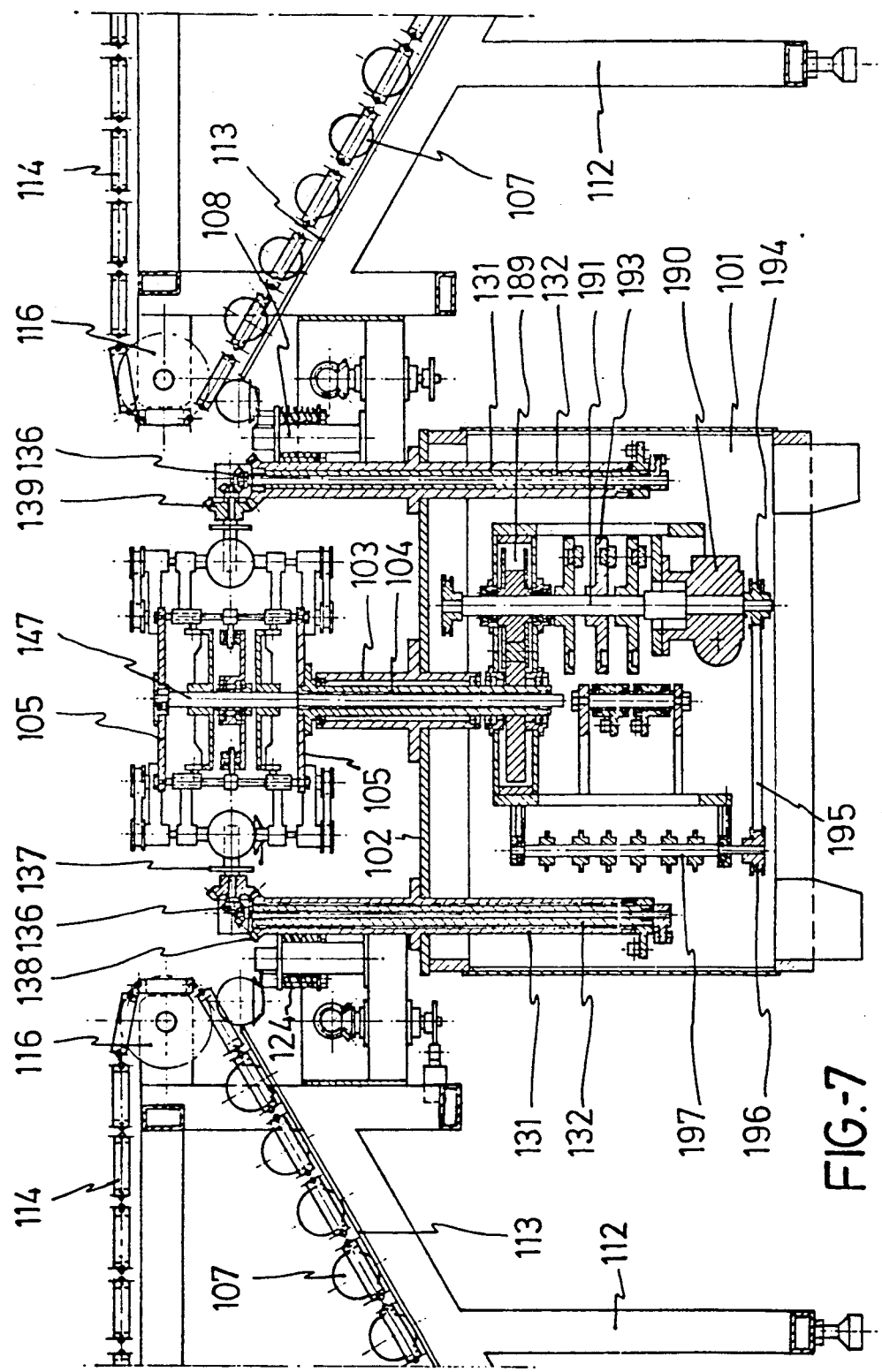
FIG. 7 shows a general elevation of the same machine.
Figure 16:
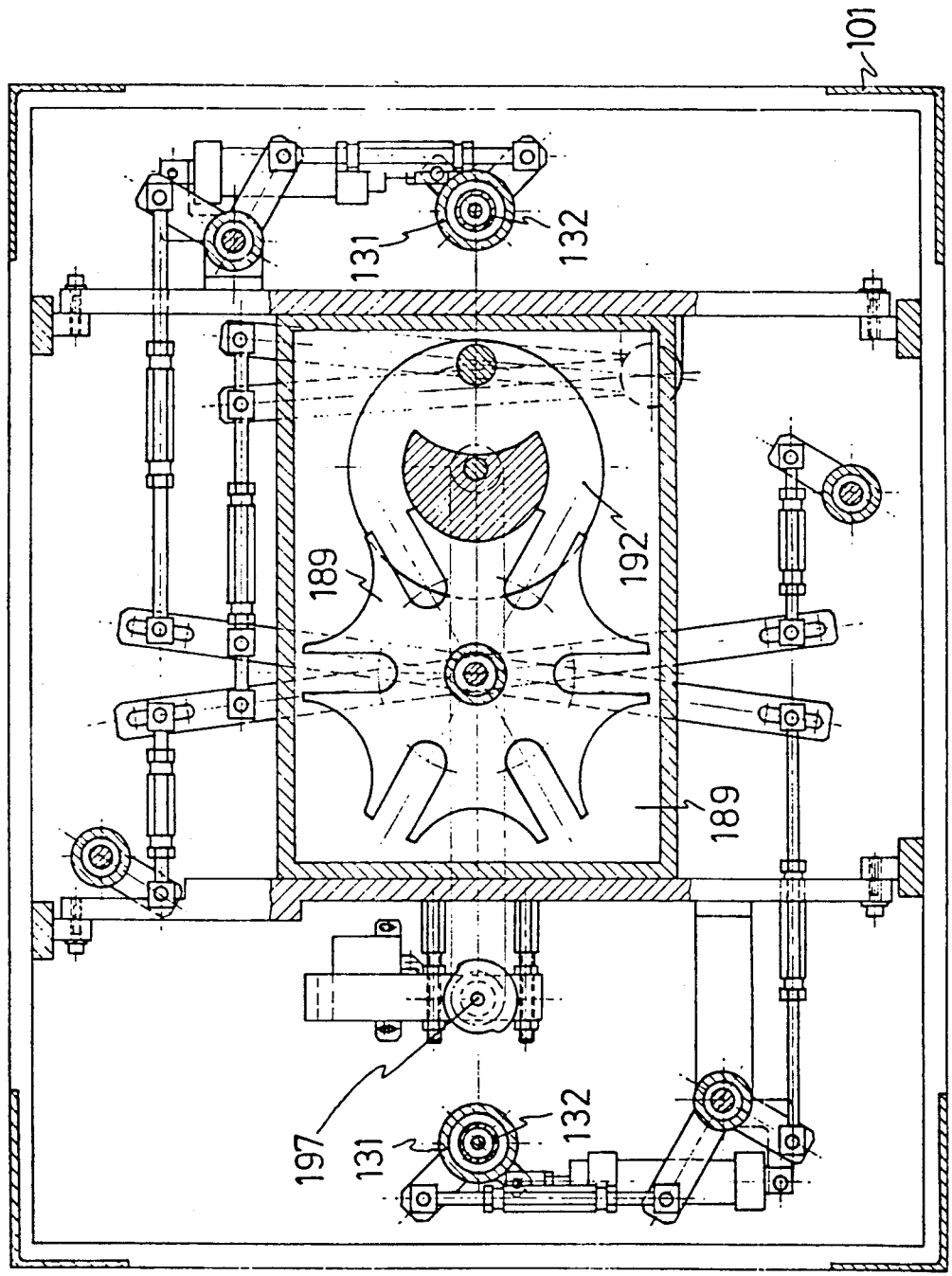
FIG. 16 shows a detail of the transmission mechanisms which provide the central turret with its intermittent movement.

FIG. 16 also shows the motive transmission elements provided within the bed (101), specifically the Maltese cross (189), likewise visible in FIG. 7, which receives the motion of the geared motor (190) via the shaft (191), and more specifically via the cam (192), on which shaft are keyed the eccentrics (193) for actuating, via connecting rods, the cutting assemblies in their movement towards the fruit, of the transfer turret from each hopper to the corresponding operating feed position, etc., the shaft (191) further incorporating a pulley (194) for transmitting motion, via a belt (195) and another pulley (196), to a shaft (197) in which, in turn, are provided the cams for the machine synchronisation means, that is to say, for all those non-mechanical elements thereof, that is to say for the purposes of actuating the solenoids which govern the various hydraulic cylinders mentioned above, together with the electric motors for actuating the knives.

I claim:

1. Fruit-peeling machine for fruits having a rounded approximately circumferential configuration, comprising:

a base platform;
    a general arm of formed configuration arranged on the base platform and having a laterally oriented concavity and fork branches with ends;
    shoes provided between the ends of the fork branches so as to form a fruit retaining jaw that is actuatable so that a center of the fruit is maintained at a constant elevation irrespective of the fruit size, said forked arm being pivotable about a vertical axis so that the fruit is movable from a fruit collection zone to a peeling zone that is angularly offset relative to the collection zone;
    latch means provided in the peeling zone for fixing a position of the jaw;
    a pair of sets of knives arranged on both sides of the jaw, each set of knives having an approximately semicircumferential distribution, said knives being mounted on a pivot arm which is actuatable in a direction of movement toward and away from the fruit; and
    a motor mounted on the pivot arm of the knives and being connected to the knives so as to actuate each set of knives in a rotary direction.

2. Fruit-peeling machine according to claim 1, wherein a pivoting shaft for the forked general arm simultaneously constitutes means for transmitting rotary motion to the jaw, and consequently to the fruit, the rotary motion being provided by a motor situated underneath the base platform which transmits the motion to a pinion provided at a lower end of said pivoting shaft, the pivoting shaft having at its ends two pulleys, the shoes of the jaw having shafts with pulleys, and tooth belts being provided so as to be associated with the pulleys of the pivoting shaft and with the pulleys provided on the shafts of the shoes of the jaw.

3. Fruit-peeling machine according to claim 2, wherein the shafts of the shoes of the jaw are mounted to be free to rotate on corresponding bushings which are solidly fixed to the ends of the forked arm, said shaft of the shoes being hollow and having a polygonal orifice in which respective square-section rods are provided and to which the shoes of the jaw are solidly fixed, said jaws furthermore being solidly fixed to respective arms which are slidingly mounted on the pivoting shaft of the forked arm, by means of respective bushings, so that a spacing between the shoes is variable without loss of angular transmission, said machine further comprising means acting on the respective bushings for opening and closing the jaw, said opening and closing means including one of a cylinder acting upon a pair of tension member and a manually activated scissor-type mechanism.

4. Fruit-peeling machine according to claim 1, and further comprising a cylinder and a connecting rod connected to the jaw so as to associate the pivoting assembly with a fixed frame of the machine and laterally pivot the jaw from the collection zone to the peeling zone.

5. Fruit-peeling machine according to claim 1, and further comprising a sensor fixed to each pivot arm on which a knife is mounted, a shaft of each knife passes through a corresponding pivoting arm and ends in a pinion, all the pinions of the various knives of a single set engaging with an output pinion of the motor, all the pivot arms of a single group of knives being mutually solidly fixed and being pivotable.

6. Fruit-peeling machine according to claim 1, and further comprising a central turret arranged on a suitable bed, the central turret having a pair of rotary plates around which six operating positions are provided so as to form two identical groups, each of said groups having a feed operating position, a peeling operation position and an operating position in which residual polar caps from a previous peeling phase are cut, the rotary plates incorporate a plurality of clamps for restraining the fruit, which clamps coincide numerically with the above-mentioned operating positions, said plates being subjected to an intermittent motion generated by a geared motor and via a cam acting on a Maltese cross associated with a shaft of the plates so that the plates can rotate with intermittent stops at the above-mentioned operating positions.

7. Fruit-peeling machine according to claim 6, wherein at each feed operation position an auxiliary turret is provided which has a top that terminates in an upper plate that supports various pans which individually receive the fruit from a feed hopper in which the fruit is entrained in an upward direction on an inclined ramp by a plurality of cleats which are oversized with respect to the fruit and have a open bottom, entrained by lateral chains, said cleats being arranged so that each fruit falls from the cleat onto a pan at a moment when the fruit reaches an upper edge of the inclined ramp, a shaft being provided within each auxiliary turret so as to impart to the upper plate an intermittent rotary motion for planetary movement of the pans to a zone opposite the feed hopper, where a product receiving clamp is provided.

8. Fruit-peeling machine according to claim 7, wherein said product receiving clamp is mounted on a second, fixed auxiliary turret having a hollow interior that accommodates a movable turret having an upper end elbowed radially to terminate at a free end in the clamp so that, via this radial shank, the clamp is laterally pivotable toward a frontmost turret of the machine, said clamp having supports mounted so as to slide on a vertical shaft against respective springs which tend to close said clamp against diametrically opposite points of the fruits, a cam being provided so as to open said clamp, said cam being movable within said shank and, via a set of conical pinions, receives a motion from a shaft that passes vertically through the fixed turret, the clamp support being associated with a plate to which a toothed ring gear is fixed which engages with a second toothed, fixed ring gear that is fixed to an upper end of the turret so that the angular pivoting of the shank for the planetary movement of the clamp causes a rotary movement in the support thereof, the two jaws of the clamp, vertically aligned at a time of receiving the fruit, being movable to be horizontally aligned, at a moment when said fruit is released, to a corresponding clamp provided on the plates of a central turret of the machine.

9. Fruit-peeling machine according to claim 8, wherein each clamp of each operating position of the central turret of the machine is mounted on two parallel and horizontal support arms which, in turn, are fixed to two support blocks which slide on two vertical shafts, each of said support blocks being associated with both vertical shafts, and springs being mounted on said vertical shafts so as to cause said supports to tend to move together, which supports blocks further incorporate knuckles that bear on two cams associated with a shaft that passes axially through the central turret of the machine, so that the two cams form control elements for opening and closing the clamp.

10. Fruit-peeling machine according to claim 9, wherein a disc is provided between the two cams associated with the shaft of the central turret, on which disc is mounted, in alignment with each operating position of the machine, a support on which a synchronization pinion is rotatably mounted so as to simultaneously engage two racks machined in the support blocks of the two arms of the clamp so that the relative movement of the two arms is inter-related and synchronized.

11. Fruit-peeling machine according to claim 10, wherein the jaws of the clamp receive two shafts which pass through the free end of the support arms, said shafts ending in two pulleys by means of which the fruit acquires a rotary movement, said pulleys being associated by belts with two pulleys mounted on a common shaft and including a lower pulley having fixed thereto, a clutch ring with which a clutch disc and a clutch plate interact, the clutch plate being actuated by a cylinder via a rocker arm so that the fruit acquires said rotary movement from a general geared motor of the machine when the cylinder is actuated via a corresponding solenoid and from a cam shaft which acts on the synchronization pinion.

12. Fruit-peeling machine according to claim 11, wherein two sets of knives are provided at each peeling operating position, sensors being associated with each two sets of knives mounted on respective supports and provided with shafts for rotation by means of a cardan transmission which permits lateral pivoting of the knives against tension of a spring which determines a peeling pressure, the shaft of one of the knives of each group terminating in a pulley, via which the shaft receives rotary motion from an electric motor, and said shaft having a pinion arranged so as to transmit motion to remaining knives in the group.

13. Fruit-peeling machine according to claim 12, wherein at each operating position for cutting the residual polar caps, two parallel horizontal discoidal knives are provided, associated with two pivoting arms that are actuatable via connecting rods by corresponding cutting cylinders, which arms are mounted so as to be axial movable on fixed pivotable shafts, and parallel and adjacent to which are other fixed arms that terminate in broad-toothed sectors, whose radius of curvature coincides with that of the movement of the shafts of the knives, pinions are in turn fixed to the pivotable shafts so as to engage with said toothed sectors and via which the cutting knives are subjected to a rapid rotary movement accompanied by the planetary movement thereof, and further comprising an expeller cylinder, at a halfway level between the two cutting cylinders, provided so as to act via a connecting rod on the fruit laterally with the assistance of a pan associated with the free end of said connecting rod, after the cutting phase has been completed and during the operation of opening the clamp, said clamp having in each of its two jaws, two cups which are retractable counter to the tension of respective springs which, when the clamp is open, are provided so as to expel the residual caps fixed to said clamp by virtue of stellate projections on the leading edges thereof which stellate projections can penetrate into the fruit in order to improve the gripping thereof in its rotary movement during the cutting phase.

14. Fruit-peeling machine according to claim 13, wherein with the bed, there is provided the geared motor for the mechanical actuation of the various elements thereof, on the shaft of the motor there are provided actuating eccentrics for the connecting rods which acts on the feed positions, and on the cam which acts upon the Maltese cross which imparts the intermittent motion to the central turret or shaft, this shaft incorporating a pulley via which the motion is transmitted, with the assistance of a belt and of another pulley, in a synchronized manner, to a cam shaft for the non-mechanical synchronization devices for the solenoids which control the hydraulic cylinders of the machine.

15. Fruit-peeling machine according to claim 1, wherein each cutting knife, which forms a type of cup, is provided at its edge with a plurality of internal facets in a half-moon configuration distributed in an equiangular manner along said edge and very close together, obtained by cutting on the edge of the cup a plurality of imaginary cylinders whose axes pass through the axis of the knife and form therewith angles of substantial amplitude, all this in a manner such that a broken or toothed rim is provided at the cutting edge of the knife, having curved, concave facets extending towards the inner face of the edge.

* * * * *